United States Patent [19]
Liu

[11] Patent Number: 5,978,238
[45] Date of Patent: Nov. 2, 1999

[54] ACTIVE CLAMP FOR BUCK-BASED CONVERTER AND METHOD OF OPERATION THEREOF

[75] Inventor: Rui Liu, Plano, Tex.

[73] Assignee: Lucent Technologies Inc., Murray Hill, N.J.

[21] Appl. No.: 09/053,954

[22] Filed: Apr. 2, 1998

[51] Int. Cl.[6] .................................................. H02H 7/122
[52] U.S. Cl. ................................................ 363/56; 363/17
[58] Field of Search ................................. 363/17, 21, 53, 363/56; 323/222

[56] References Cited

U.S. PATENT DOCUMENTS

| | | | |
|---|---|---|---|
| 5,278,748 | 1/1994 | Kitajima | 363/56 |
| 5,590,032 | 12/1996 | Bowman et al. | 363/127 |
| 5,615,094 | 3/1997 | Cosentino et al. | 363/56 |
| 5,644,480 | 7/1997 | Sako et al. | 363/17 |
| 5,726,869 | 3/1998 | Yamashita et al. | 363/21 |
| 5,731,966 | 3/1998 | Liu | 363/56 |
| 5,736,842 | 4/1998 | Javanovic | 323/222 |

OTHER PUBLICATIONS

U.S. Appliction No. 09/036,538 Entitled "Power Converter Having a Low–Loss Clamp and Method of Operation Thereof"; Filed Mar. 6, 1998; inverntor: Loveday H. Mweene.

U.S. Application No. 08/921,995 Entitled "Active Snubber For Buck–Based Converters and Method of Operation Thereof"; Filed Aug. 27, 1997, inventor: Rui Liu.

Philip C. Todd; Snubber Circuits: Theory, Design and Application; 1993 Unitrode Power Supply Design Seminar; pp. 2–1 through 2–17.

J.A. Sabate, V. Vlatkovic, R. B. Ridley and F.C. Lee; High–Voltage, High–Power, ZVS, Full–Bridge PWM Converter Employing an Active Snubber; VPEC Seminar Record 1991; pp. 125–129.

Loveday H. Mweene, Chris A. Wright, and Martin F. Schlect; A 1 kW, 500 kHz Front–End Converter for a Distributed Power Supply System; IEEE Applied Power Electronics Conference Record, 1989, pp. 423–432.

Primary Examiner—Adolf Deneke Berhane

[57] ABSTRACT

For use with a buck-based converter having a rectifier that receives current from a secondary side of a isolation transformer, an active clamp and a method of operating the buck-based converter to manage reverse recovery energy therein. In one embodiment, the active clamp includes: (1) an auxiliary transformer coupled across the isolation transformer and (2) an auxiliary switch, interposed between the auxiliary transformer and the rectifier, that: (2a) closes as a function of an output voltage of the rectifier to cause the auxiliary transformer to receive reverse recovery energy from the rectifier and deliver the reverse recovery energy to a primary side of the isolation transformer and (2b) opens to limit a magnetic flux of a core of said auxiliary transformer.

20 Claims, 2 Drawing Sheets

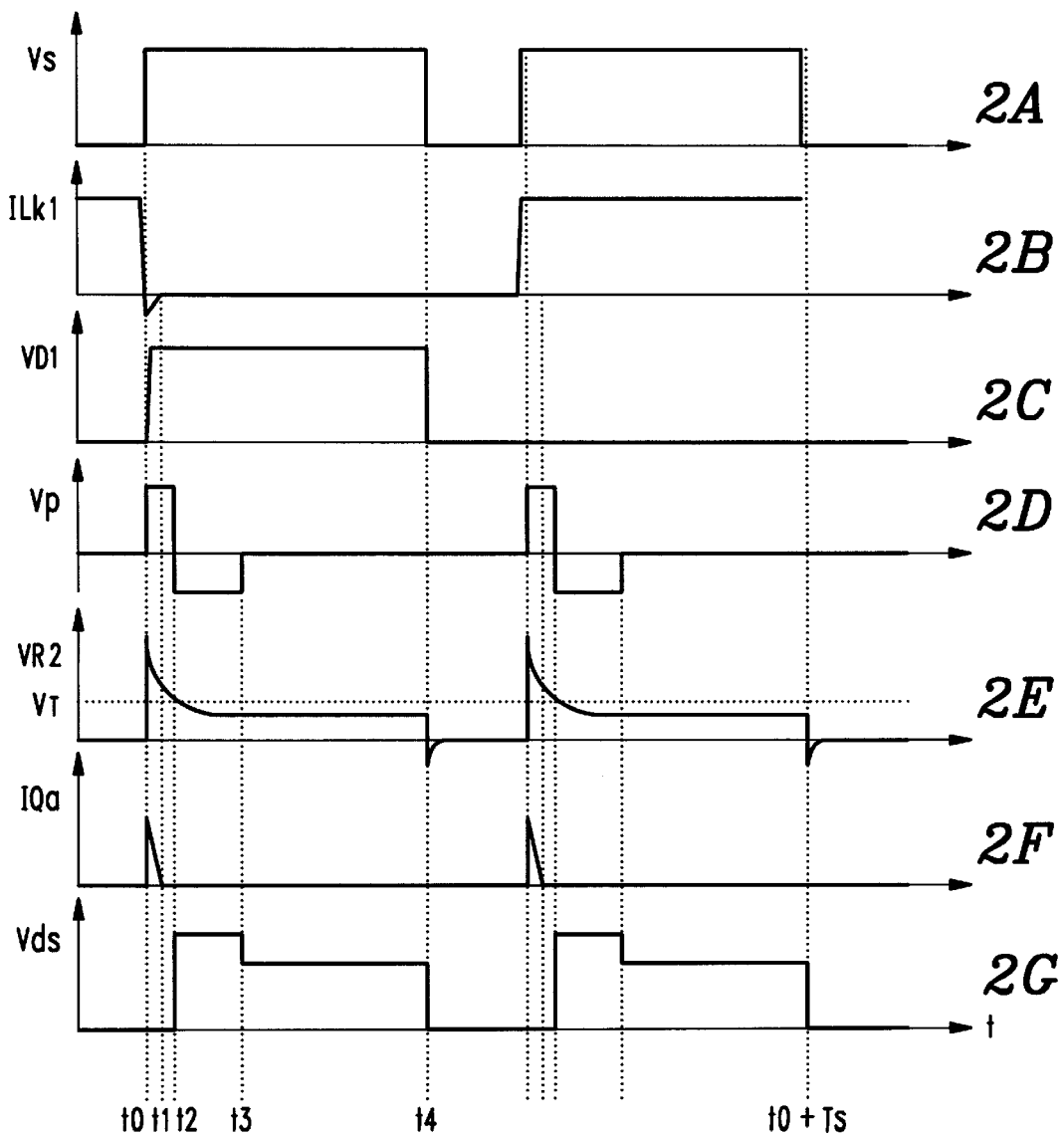

5,978,238

ACTIVE CLAMP FOR BUCK-BASED CONVERTER AND METHOD OF OPERATION THEREOF

TECHNICAL FIELD OF THE INVENTION

The present invention is directed, in general, to power conversion and, more specifically, to a buck-based converter having an active clamp and a method of operating such buck-based converter to manage reverse recovery energy more efficiently.

BACKGROUND OF THE INVENTION

A power converter is a power processing circuit that converts an input voltage waveform into a specified output voltage waveform. In many applications requiring a DC output, switched-mode DC/DC converters are frequently employed to advantage. DC/DC converters generally include an inverter, an input/output isolation transformer and a rectifier on a secondary side of the isolation transformer. The inverter generally includes a switching device, such as a field effect transistor ("FET"), that converts the DC input voltage to an AC voltage. The input/output isolation transformer, then, transforms the AC voltage to another value and the rectifier generates the desired DC voltage at the output of the converter. Conventionally, the rectifier comprises a plurality of rectifying diodes that conduct the load current only when forward-biased in response to the input waveform to the rectifier.

Unfortunately, rectifying diodes suffer from a reverse recovery condition when there is a transition from a conduction stage to a non-conduction stage. During the reverse recovery condition, the current through the diodes reverse direction, causing excess energy to be stored in the leakage inductance of an isolation transformer and power to be lost in the diodes. The energy stored in the leakage inductance is dissipated in a resonant manner with the junction capacitance of the rectifying diode, causing oscillation (or ringing) in the voltage waveform of the rectifying diode. As a result, the converter suffers efficiency losses that impair the overall performance of the converter. Therefore, efforts to minimize the losses associated with the rectifier and, more specifically, with the rectifying diodes will improve the overall performance of the converter.

A traditional manner to reduce the losses associated with the rectifying diodes is to introduce a snubber circuit coupled to the rectifying diodes. For instance, a resistor-capacitor-diode (RCD) snubber circuit is disclosed in "A 1 kW, 500 kHz Front-End Converter for a Distributed Power Supply System", by L. H. Mweene et al., Proc. IEEE Applied Power Electronics Conf., p. 423–432 (1989), which is incorporated herein by reference. The RCD snubber circuit not only effectively damps out oscillations in the rectifier's diode voltage, but also recovers a portion of the energy stored in the snubber capacitor to the output. During each switching transient, the reverse recovery energy due to the recovery process of the diodes is first stored in the snubber capacitor followed by a transfer of the energy to the output through the snubber resistor. During this process, some power is dissipated in the snubber resistor. As the output power increases, the power dissipated in the snubber resistor becomes significant thereby limiting the RCD snubber to low power applications. To reduce the power loss in the snubber resistor, a lossless snubber circuit is proposed in "High-Voltage, High-Power, ZVS, Full-Bridge PWM Converter Employing an Active Snubber" by J. A. Sabaste et al., 1991 VEPC Seminar Proc., pp. 125–130, which is incorporated herein by reference.

This circuit operates in the same way as an RCD snubber circuit, except that the energy taken into the snubber circuit is recovered to the auxiliary inductor through the oscillation between the auxiliary inductor and the snubber capacitor, after the auxiliary switch is turned on. However, the snubber circuit will lose its effectiveness if the converter is operated at very between the auxiliary inductor and the snubber capacitor, after the auxiliary switch is turned on. However, the snubber circuit will lose its effectiveness if the converter is operated at very small duty ratio, resulting in insufficient time to discharge the energy stored in the snubber circuit.

An alternative approach to manage the losses associated with the reverse recovery condition is to employ a clamp circuit coupled to the rectifying diodes as disclosed in "Snubber circuits: Theory, Design and Application", by Philip C. Todd, Unitrode Power Supply Design Seminar Note, p. 2-1, 2-15 (1993), which is also incorporated herein by reference. The clamp circuit disclosed in Todd limits the peak voltage and reduces the stress across components within the converter. An advantage associated with such a circuit is that a clamp circuit does not dissipate energy in the converter.

Unfortunately, the clamp circuit introduced in Todd is limited to applications wherein the output voltage of the converter is fixed. Modifications can be made to the clamp circuit, however, to make it independent of the output voltage. For example, a coupling transformer may be connected across the main transformer effectively recovering excess transient energy to the primary side of the transformer. An impediment to the use of such a circuit is that the coupling transformer of the clamp circuit is generally comparable in size to the main transformer due to the large volts-second of the main transformer. Accordingly, what is needed in the art is an active clamp circuit for a rectifier that recovers the reverse recovery energy to thereby reduce the power losses associated with the rectifier and oscillations in both voltage and current therefrom.

SUMMARY OF THE INVENTION

To address the above-discussed deficiencies of the prior art, the present invention provides, for use with a buck-based converter having a rectifier that receives current from a secondary side of a isolation transformer, an active clamp and a method of operating the buck-based converter to manage reverse recovery energy therein. In one embodiment, the active clamp includes: (1) an auxiliary transformer coupled across the isolation transformer and (2) an auxiliary switch, interposed between the auxiliary transformer and the rectifier, that: (2a) closes as a function of an output voltage of the rectifier to cause the auxiliary transformer to receive reverse recovery energy from the rectifier and deliver the reverse recovery energy to a primary side of the isolation transformer and (2b) opens to limit a magnetic flux of a core of said auxiliary transformer.

The present invention therefore introduces the broad concept of switchably controlling an auxiliary transformer such that (1) the auxiliary transformer is part of an active clamp circuit to recover the reverse recovery energy, when the output rectifiers experience reverse recoveries, and (2) the auxiliary transformer is disconnected from the active clamp circuit when the reverse recovers process ends. This allows the auxiliary transformer to assume a smaller size than would have been allowed in prior art clamps.

In one embodiment of the present invention, the active clamp further includes an auxiliary diode, coupled to the auxiliary transformer, that prevents forward currents from bypassing the isolation transformer.

In one embodiment of the present invention, the active clamp further includes a voltage divider, coupled to the rectifier, that provides intermediate voltages for controlling the auxiliary switch. In an embodiment to be illustrated and described, the voltage divider is designed to set the time at which the auxiliary switch closes.

In one embodiment of the present invention, the auxiliary transformer includes a reset winding employable to reset said core of the auxiliary transformer. The reset winding can be employed to prevent the auxiliary transformer from saturating during its duty cycle.

In one embodiment of the present invention, the auxiliary switch closes as the output voltage of the rectifier rises. In a 20 related embodiment, the auxiliary switch remains closed for a predetermined period of time. In an embodiment to be illustrated and described, the timing of the closing and opening of the auxiliary switch is selected to minimize the size of the auxiliary transformer without sacrificing the effectiveness of the active clamp circuit.

The foregoing has outlined, rather broadly, preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, reference is now made to the following descriptions taken in conjunction with the accompanying drawings, in which:

FIGS. 2A–2G illustrate exemplary voltage and current waveforms of the DC/DC converter of FIG. 1.

DETAILED DESCRIPTION

Figure 1:
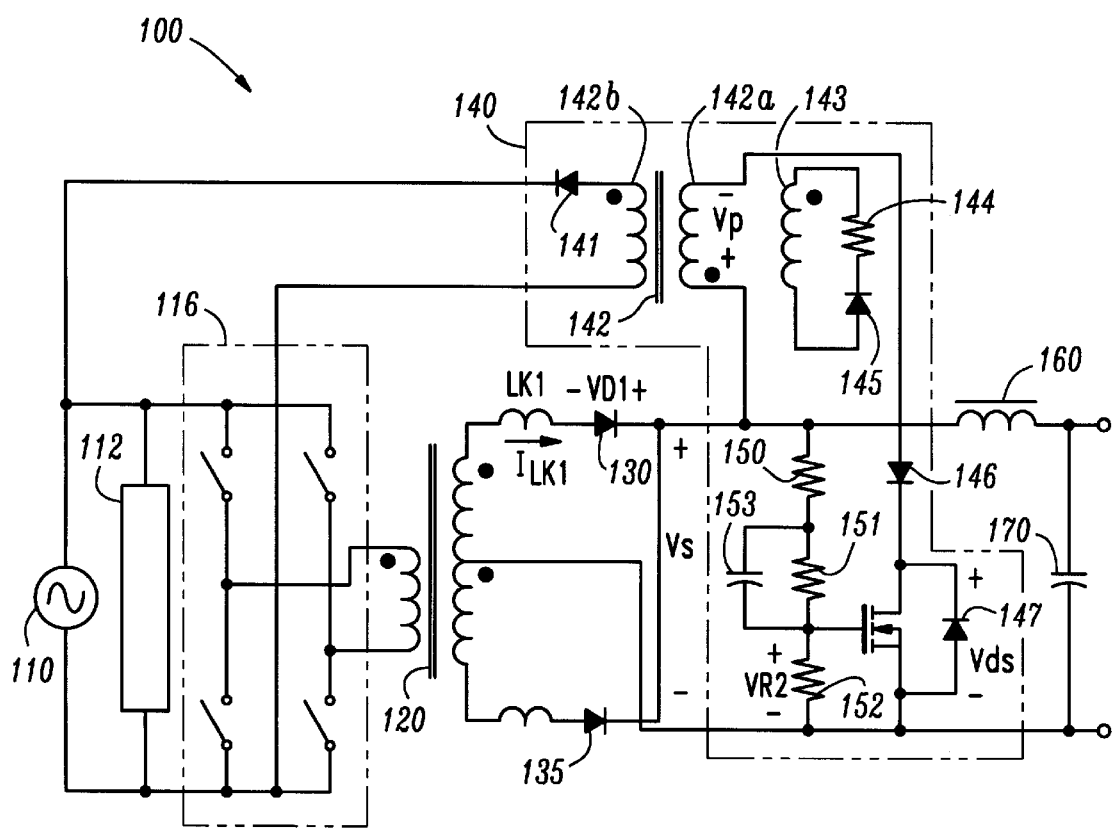
FIG. 1 illustrates a schematic diagram of an embodiment of a buck-based DC/DC converter employing an embodiment of an active clamp circuit constructed according to the principles of the present invention.

Referring initially to FIG. 1, illustrated is a schematic diagram of an embodiment of a buck-based DC/DC converter 100 employing an embodiment of an active clamp circuit 140 constructed according to the principles of the present invention. The DC/DC converter 100 (e.g., a full-bridge phase shift converter) is coupled to a source of electrical power 110 and includes an input rectifier 112 and an inverter 116 consisting of four switches. Inverters forming part of power supplies are well known in the art and therefore will not be further discussed. A primary winding of an isolation transformer 120 is coupled to the inverter 116 and a secondary winding of the isolation transformer 120 is coupled to a rectifier (including a first and a second rectifying diode 130, 135). The first and second rectifying diodes 130, 135 are coupled to the active clamp 140 and an output inductor 160. The output inductor 160 is further coupled to an output capacitor 170 that, in turn, is coupled to a center tap of the secondary winding of the isolation transformer 120.

The active clamp 140 includes an auxiliary transformer 142, having a primary winding 142a and a secondary winding 142b and coupled across the isolation transformer 120, allowing the active clamp 140 to recover energy to the primary side of the isolation transformer 120. A first auxiliary diode 141 is coupled between a primary side of the auxiliary transformer 142 and the primary side of the isolation transformer 120. A second auxiliary diode 146 and an auxiliary switch 147 are coupled between a secondary side of the auxiliary transformer 142 and the center tap of the secondary winding of the isolation transformer 120.

The auxiliary transformer 142 includes a third winding (a reset winding) 143 used to reset the core of the auxiliary transformer 140 during a period when the auxiliary switch 147 is off. A resistor 144 and a third auxiliary diode 145 are additionally coupled to the reset winding 143.

The auxiliary switch 147 is controlled by an RC circuit consisting of first, second and third control resistors 150, 151, 152 and a control capacitor 153. The three control resistors 150, 151, 152 makeup a voltage divider that is coupled to the rectifying diodes 130, 135 and provides intermediate voltages for controlling the auxiliary switch 147.

Turning now to FIGS. 2A–2G, illustrated are exemplary voltage and current waveforms of the DC/DC converter 100 of FIG. 1. FIG. 2A represents a center tap voltage Vs between the outer taps and the center tap of the secondary winding of the isolation transformer 120. FIG. 2B represents a leakage inductance current ILk1 of the isolation transformer 120. FIG. 2C represents a voltage VD1 across the first rectifying diode 130. FIG. 2D represents a voltage Vp across the primary winding 142a of the auxiliary transformer 142. FIG. 2E represents a voltage VR2 across the third control resistor 152. FIG. 2F represents a current IQa through the auxiliary switch 147. FIG. 2G represents a drain-to-source voltage Vds across the auxiliary switch 147.

With continuing reference to FIG. 1, the operation of the converter 100 will hereinafter be described. At a time $t_0$, the auxiliary switch 147 is turned on when the center tap voltage Vs changes from zero to positive. Since the auxiliary transformer 142 has the same turns ratio as the isolation transformer 120, the center tap voltage Vs is clamped at its steady state value, which is equal to the primary bus voltage divided by the turns ratio of the isolation transformer 120. Once the center tap voltage Vs is clamped, the energy stored in the leakage inductance of the isolation transformer 120, due to the reverse recovery process of the rectifying diodes 130, 135, is discharged to the primary side of the isolation transformer 120 through the auxiliary transformer 142 and the coupling diode 141.

The energy discharge, during time interval $[t_0, t_1]$, appears as a negative leakage inductance current Ilk1 and as the current IQa through the auxiliary switch 147. Just as the discharge is completed, the currents Ilk1, IQa drop to zero at time $t_1$. The auxiliary switch 147 is then turned off when an intermediate voltage VR2 across the third control resistor 152 is less than a preselected threshold voltage. As a result, the auxiliary transformer 142 is prevented from saturating by isolating it from isolation transformer 120. After the auxiliary switch 147 is turned off at time $t_2$, the center tap voltage Vs is applied across the auxiliary switch 147.

Again, the conduction period of the auxiliary switch 147 is controlled by the RC circuit. When the center tap voltage Vs increases from zero, the first control resistor 150 is shorted by the control capacitor 153 and the center tap voltage Vs is applied across the second and third control resistors 151, 152. When the voltage VR2 across third control resistor 152 is greater than a preselected threshold voltage, between time period $t_0$–$t_2$, the auxiliary switch 147 is turned on. As the voltage across the control capacitor 153 increases, the voltage VR2 across the third control resistor 152 decreases after the center tap voltage Vs reaches its steady state value. Once the voltage VR2 across the third control resistor 152 falls below the preselected threshold voltage, at time $t_2$, the auxiliary switch 147 turns off.

The on-time of the auxiliary switch 147 should be greater than the energy transfer period ($t_0$–$t_1$) and is set by the time constant of the three control resistors 150, 151, 152, and the control capacitor 153. Thus, the auxiliary switch 147 turns on (i.e., closes) in response to the rectifier (i.e., the rectifying diodes 130, 135) voltage as conditioned by the voltage divider (i.e., the control resistors 150, 151, 152). As a result, the auxiliary transformer 142 recovers the reverse recovery energy and transfers that energy to the primary side of the isolation transformer 120.

During time interval $t_2$–$t_3$, the reset winding 143 is energized and the polarity of the secondary winding of the isolation transformer is oriented to reset the core of the auxiliary transformer 142. Once the reset winding 143 is de-energized, at a time $t_3$, and until the center tap voltage Vs drops from its steady state value, at a time $t_4$, the voltage Vp across the secondary winding of the auxiliary transformer 142 stays at zero. Since the time interval $[t_0,t_2]$ is much less than the time interval $[t_0,t_4]$, the volts-second, $Vs*(t_2-t_0)$, of the auxiliary transformer 142 is less than the volts-second, $Vs*(t_4-t_0)$, of the isolation transformer 120. Consequently, the flux and the size of the auxiliary transformer 142 is smaller than the size of the isolation transformer 120 (e.g., the auxiliary transformer 142 is about ⅓ the size of the isolation transformer 120). In other words, after the reverse recovery energy is transferred during the time interval $[t_0,t_2]$, the auxiliary switch 147 turns off (i.e., opens), thus limiting the flux and, consequently, the size of the auxiliary transformer 142. Additionally, the effectiveness of the clamp circuit 140 is independent of the output voltage of the converter 100.

For a better understanding of power electronics, power converter topologies, such as buck-based power converter, and snubber circuits, see: *Principles of Power Electronics*, by J. Kassakian and M. Schlecht, Addison-Wesley Publishing Company (1991), which is incorporated herein by reference.

Although the present invention has been described in detail, those skilled in the art should understand that they can make various changes, substitutions and alterations herein without departing from the spirit and scope of the invention in its broadest form.

What is claimed is:

1. For use with a buck-based converter having a rectifier that receives current from a secondary side of a isolation transformer, an active clamp, comprising:
    an auxiliary transformer coupled across said isolation transformer; and
    an auxiliary switch, interposed between said auxiliary transformer and said rectifier, that:
        closes as a function of an output voltage of said rectifier to cause said auxiliary transformer to receive reverse recovery energy from said rectifier and deliver said reverse recovery energy to a primary side of said isolation transformer and
        opens to limit a magnetic flux of a core of said auxiliary transformer.

2. The active clamp as recited in claim 1 further comprising an auxiliary diode, coupled to said auxiliary transformer, that prevents a flow of current from said primary side of said auxiliary transformer to said rectifier.

3. The active clamp as recited in claim 1 further comprising a voltage divider, coupled to said rectifier, that provides intermediate voltages for controlling said auxiliary switch.

4. The active clamp as recited in claim 1 wherein said auxiliary switch prevents said auxiliary transformer from saturating.

5. The active clamp as recited in claim 1 wherein said auxiliary transformer includes a reset winding employable to reset said core of said auxiliary transformer.

6. The active clamp as recited in claim 1 wherein said auxiliary switch closes as said output voltage of said rectifier rises.

7. The active clamp as recited in claim 1 wherein said auxiliary switch remains closed for a predetermined period of time.

8. A method of operating a buck-based converter to manage reverse recovery energy therein, said converter having a rectifier that receives current from a secondary side of a isolation transformer, comprising the steps of:
    closing an auxiliary switch interposed between an auxiliary transformer and said rectifier as a function of an output voltage of said rectifier to cause said auxiliary transformer to receive reverse recovery energy from said rectifier and deliver said reverse recovery energy to a primary side of said isolation transformer; and
    opening said auxiliary switch to limit a magnetic flux of a core of said auxiliary transformer.

9. The method as recited in claim 8 further comprising the step of preventing a flow of current from said primary side of said auxiliary transformer to said rectifier.

10. The method as recited in claim 8 further comprising the step of providing intermediate voltages for controlling said auxiliary switch.

11. The method as recited in claim 8 wherein said step of opening comprises the step of preventing said auxiliary transformer from saturating.

12. The method as recited in claim 8 further comprising the step of employing a reset winding in said auxiliary transformer to reset a core of said auxiliary transformer.

13. The method as recited in claim 8 wherein said step of closing is carried out as said output voltage of said rectifier rises.

14. The method as recited in claim 8 further comprising the step of continuing to close said auxiliary switch for a predetermined period of time.

15. A buck-based DC/DC converter, comprising:
    an isolation transformer having primary and secondary sides;
    a rectifier coupled to said secondary side of said isolation transformer and subject to reverse recovery currents;
    an auxiliary transformer coupled across said isolation transformer and having primary and secondary sides; and
    an auxiliary switch, interposed between said auxiliary transformer and said rectifier, that:
        closes as a function of an output voltage of said rectifier to cause said auxiliary transformer to receive reverse recovery energy from said rectifier and deliver said reverse recovery energy to said primary side of said isolation transformer and
        opens to limit a magnetic flux of a core of said auxiliary transformer.

16. The DC/DC converter as recited in claim 15 further comprising an auxiliary diode, coupled to said auxiliary transformer, that prevents a flow of current from said primary side of said auxiliary transformer to said rectifier.

17. The DC/DC converter as recited in claim 15 further comprising a voltage divider, coupled to said rectifier, that provides intermediate voltages for controlling said auxiliary switch.

18. The DC/DC converter as recited in claim 15 wherein said auxiliary transformer includes a reset winding employable to reset a core of said auxiliary transformer.

19. The DC/DC converter as recited in claim 15 wherein said auxiliary switch closes as said output voltage of said rectifier rises.

20. The DC/DC converter as recited in claim 15 wherein said auxiliary switch remains closed for a predetermined period of time.

* * * * *